(No Model.) 2 Sheets—Sheet 1.

C. G. BURKE.
TELEGRAPHIC INSTRUMENT.

No. 460,110. Patented Sept. 29, 1891.

Witnesses
Geo. W. Breck.
R. F. Gaylord

Inventor
Charles G. Burke
By his Attorneys
Duncan, Curtis & Page (No Model.) 2 Sheets—Sheet 2.
C. G. BURKE.
TELEGRAPHIC INSTRUMENT.

No. 460,110. Patented Sept. 29, 1891.

Witnesses:
Raphaël Netter
Robt F. Gaylord

Inventor
Charles G. Burke
By Duncan, Curtis & Page
Attorneys.

UNITED STATES PATENT OFFICE.

CHARLES G. BURKE, OF RICHMOND HILL, NEW YORK.

TELEGRAPHIC INSTRUMENT.

SPECIFICATION forming part of Letters Patent No. 460,110, dated September 29, 1891.

Application filed December 26, 1889. Renewed February 11, 1891. Serial No. 381,072. (No model.)

*To all whom it may concern:*

Be it known that I, CHARLES G. BURKE, a citizen of the United States, residing at Richmond Hill, in the county of Queens and State of New York, have invented certain new and useful Improvements in Telegraphic Instruments, of which the following is a specification, reference being had to the drawings accompanying and forming a part of the same.

The invention which forms the subject of my present application is a new form of telegraphic receiving-instrument, and is an improvement on the device or apparatus shown and described in my patent granted June 25, 1889, No. 405,987.

The object of my present improvement is to produce a receiver or relay for long lines or submarine-cable circuits of great sensitiveness and delicacy of operation and of simple construction; and to this end I have constructed an instrument consisting, essentially, of two coils at approximately right angles suspended or supported in a magnetic field formed by four magnetic poles arranged in the order hereinafter described to exert simultaneously upon the coils attractive and repulsive effects co-operating to produce a given movement in one direction of the coils when the latter are traversed by an electric current.

The instrument differs in details of construction from that shown in my patent above referred to, and reference is now made to the accompanying drawings for a description, from which the precise nature of the invention will be understood.

Figure 1:
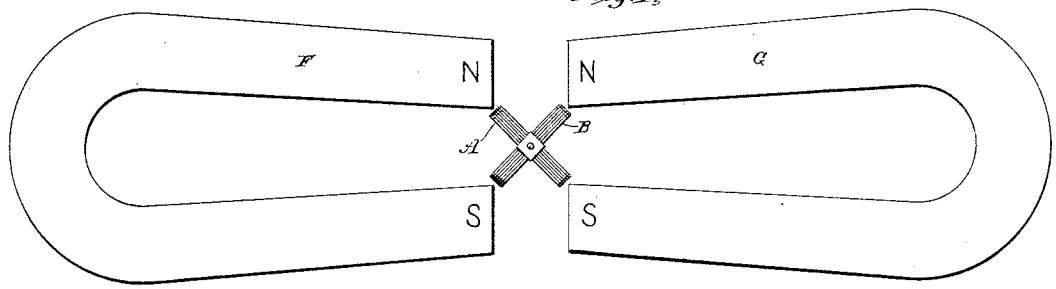
Figure 2:
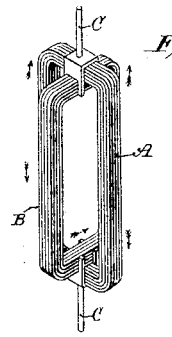
Figure 3:
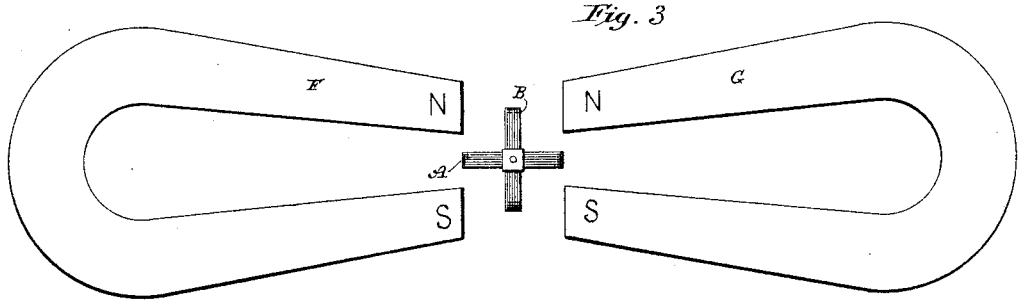
Figure 4:
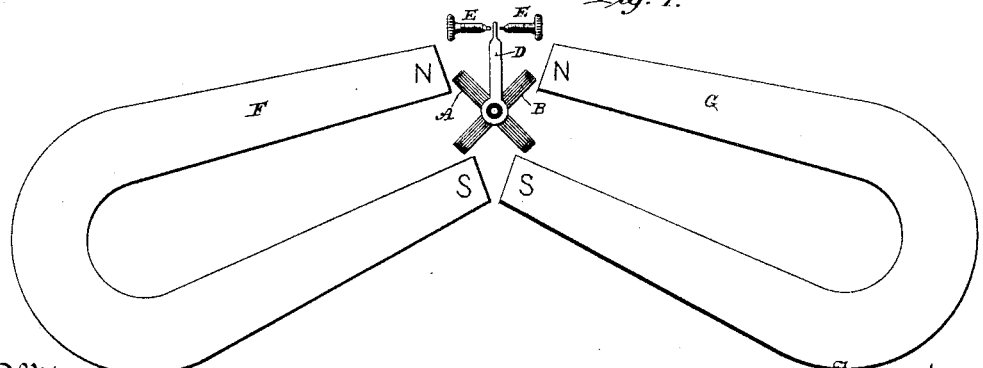

Figure 1 is a plan view of the main or operative parts of my invention. Fig. 2 is a perspective view of the coils. Fig. 3 is a view similar to Fig. 1, showing the coils in the position to which they are carried by the action of the field when a current is passed through the coils. Fig. 4 is a plan view of the instrument, showing a slightly-modified disposition of the field-magnets; and Fig. 5 is a side elevation of an instrument without the magnets, showing the manner of mounting the coils.

Two coils A and B are wound and secured together at practically right angles and provided with pivotal bearings C C or other means of support, and are mounted in any convenient and well-known manner. A contact-arm D is fixed to the coils or their supports, so as to be moved by the coils between two contact-stops E E. These coils are placed in the magnetic field produced by four poles, preferably those of two permanent horseshoe-magnets F G, placed with like poles opposite to each other, as indicated. The normal position of the coils is that shown in Fig. 1, in which opposite sides of each coil are in close proximity to opposite poles—that is to say, each coil lies obliquely across the field from a north to a south pole— and the direction of winding or order of connections is such that a current impulse through the two coils passes through each in the same direction, as indicated by the arrows in Fig. 2. With such disposition the passage of a current through the coils A and B tends to move the coils into the position shown in Fig. 3, the direction of movement depending upon the disposition of the poles and the direction of current, this movement being the result of well-known laws. I have found, however, peculiar advantages to result from this particular disposition or arrangement, and in practice I obtain a better instrument, more positive and delicate in its operation, than by the ordinary arrangement of a coil moving in a field produced by two single or consequent poles. I have also found that the effects are enhanced and a means of adjustment secured by moving the magnets about the center of oscillation of the coils into approximately the position shown in Fig. 4, in which two like poles are brought closer together than the others. This I attribute to the action of the magnetic forces or lines upon the faces of the coils, my experience with instruments of this kind leading me to the belief that more positive, repellent, and attractive effects are thus obtained.

Figure 5:
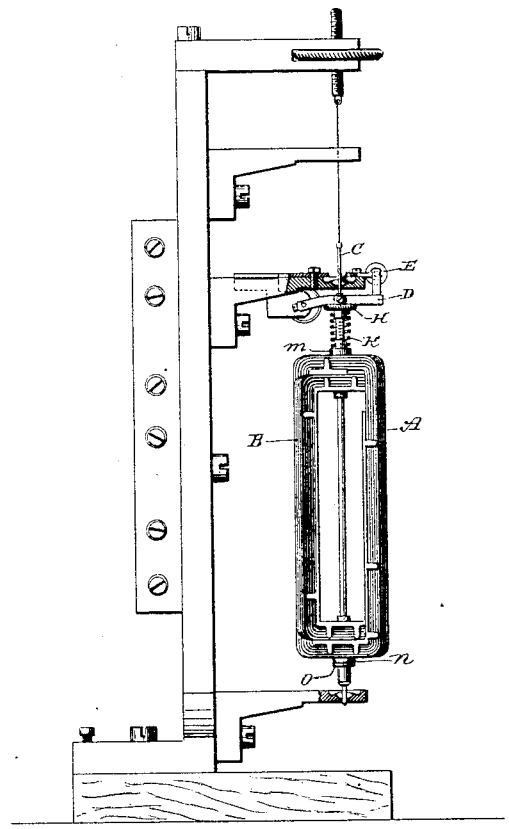

In Fig. 5 the coils are shown as applied to an instrument of the general character of those usually employed and in which for the sake of clearness the magnets and usual electrical connections are omitted.

The coils A and B are secured together at substantially right angles and are mounted loosely on a light spindle C, about which they are capable of free movement. The coils are provided with hubs $m$ $n$, through which the spindle C passes, and are held in place by the collar $o$ on the spindle upon which the hub $n$ rests.

H is a screw-head adjustable on the spindle, between which and the hub $m$ is a light spiral spring K around the spindle, by means of which the requisite friction between the coils and spindle is secured.

The contact arm or tongue D is fixed to the spindle and vibrates between the contact-points E E. By this contrivance the principle of the shifting zero is secured in a very advantageous manner. A movement of the coils around their vertical axis shifts the arm D into contact with one of the points E, the frictional connection between the coils and the spindle being sufficient for this purpose. The coils, however, are free to move through a greater arc than the arm D, so that, whatever their position, a change of potential or reversal which turns them back instantly shifts the arm D over to the opposite contact-point E.

This instrument may be employed as a recorder, a relay, or current indicator, and is applicable generally to all the uses to which instruments of a similar kind are ordinarily put.

What I claim is—

1. A telegraphic instrument consisting of two coils mounted or supported on a vertical axis at substantially right angles and movable within a field of force created by four magnetic poles, of which those in proximity to the opposite sides of the same coil are of unlike polarity, as set forth.

2. In a telegraphic instrument, the combination, with two bi-polar magnets presenting like poles, of two movable coils secured together and placed in the field formed by said coils, so that each coil lies with its opposite sides in proximity to unlike poles, as set forth.

3. The combination, with two horseshoe-magnets systematically arranged and presenting poles of like sign, of a movable coil supported in the field created by the magnets and held normally obliquely to the field with opposite sides in proximity to poles of unlike sign, as set forth.

4. In a telegraphic instrument, the combination of the spindle, the contact arm or tongue carried thereby, the contact or limiting stops between which said tongue vibrates, and the coils included in the line and mounted on the spindle with a frictional connection therewith.

5. In a telegraphic instrument, the combination of the spindle, the contact-arm carried thereby, the contact or limiting stops between which said arm vibrates, coils for imparting movement to the contact-arm, mounted loosely on the spindle, a screw or stop H on the spindle, and a spring K between the same and the hub of the coils, as set forth.

CHARLES G. BURKE.

Witnesses:
ROBT. F. GAYLORD,
PARKER W. PAGE.